US008699058B2

United States Patent
Smith et al.

(10) Patent No.: US 8,699,058 B2
(45) Date of Patent: Apr. 15, 2014

(54) METHOD AND APPARATUS FOR PROCESSING AN ELECTRONIC DOCUMENT FILE FOR PRINTING USING CONFIGURATION DATA TO DYNAMICALLY MIMIC PRINT PARAMETER INFORMATION USED BY DIFFERENT PRINTER

(75) Inventors: Glenn K. Smith, Webster, NY (US); Tien Pham, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 585 days.

(21) Appl. No.: 12/814,720

(22) Filed: Jun. 14, 2010

(65) Prior Publication Data
US 2011/0304873 A1   Dec. 15, 2011

(51) Int. Cl.
*G06F 3/12* (2006.01)

(52) U.S. Cl.
USPC .......................... 358/1.15; 358/1.9; 358/1.13

(58) Field of Classification Search
CPC .......... H04N 1/00395; H04N 1/00917; H04N 1/00962; H04N 7/2601; H04N 7/26074
USPC .................................. 358/1.1–3.29
See application file for complete search history.

(56) References Cited

U.S. PATENT DOCUMENTS

2002/0063880 A1* 5/2002 Raney .......................... 358/1.14
2006/0056859 A1* 3/2006 Otani .............................. 399/16

* cited by examiner

*Primary Examiner* — Benny Q Tieu
*Assistant Examiner* — Marcellus Augustin
(74) *Attorney, Agent, or Firm* — Fay Sharpe LLP

(57) ABSTRACT

A method for processing an electronic document file for printing may include receiving an electronic document file at a print driver for a select printer; determining the electronic document file includes different print parameter information for a different printer based on configuration data; identifying and transforming the different print parameter information to select print parameter information based on mapping information; processing document print parameter information associated with the electronic document file, where a portion of the document print parameter information was transformed from the different print parameter information; and sending a print stream to the select printer for printing the electronic document file consistent with the different print parameter information. A related system may include a storage device and a processor. The storage device may include the print driver and configuration data with the mapping information. The print driver may include input; filter; mapping; processing; and output modules.

20 Claims, 11 Drawing Sheets

METHOD AND APPARATUS FOR PROCESSING AN ELECTRONIC DOCUMENT FILE FOR PRINTING USING CONFIGURATION DATA TO DYNAMICALLY MIMIC PRINT PARAMETER INFORMATION USED BY DIFFERENT PRINTER

BACKGROUND

The present exemplary embodiment relates generally to processing an electronic document file for printing on a select printer. It finds particular application when the electronic document file includes print parameter information associated with a former printer that are at least not fully compatible with a new printer. However, it is to be appreciated that the exemplary embodiments described herein are also amenable to printing any electronic document file that includes print parameter information associated with a different printer than the printer selected for printing.

Traditionally, vendors have a hard time entering into environments where competitors have an established presence. Customers tend to resist changing what already works for them for a variety of reasons. When a customer does change to a different vendor's devices, the new vendor works with the customer in order to provide a smooth transition.

One issue that arises during this transition period is that the customer may find that their documents, which used to print correctly on previous vendor's devices, do not print correctly on the new vendor's devices. The root causes tend to be differences in media sizes, media types, and input tray selection, or differences between vendor-specific features.

Device vendors tend to release printer drivers that allow consistency amongst their own devices and do little to no work to ensure any compatibility between devices from other vendors. In fact, it's often advantageous to promote maximum incompatibility between devices from other vendors in order to make customers reluctant to switch vendors.

The customers do not care what the root causes are, their only concern is that when they printed on the previous vendor's devices, what used to print correctly now does not, forcing them to re-print documents and waste valuable resources. One way to resolve this issue is to limit replacement of current vendor devices to devices from other vendors that are more compatible. With this approach, the customer has to trade off new functionality with compatibility. Another way to resolve the issue is to revise all the customer documents to be compatible with the new vendor's devices. The customer is likely to lose revenue after deciding to switch to another vendor's device even if some of the incompatibility issues are resolved because of the amount of work required in modifying documents. Under these circumstances, the customer may remain with the current vendor and the potential new vendor loses revenue from losing the potential new customer.

INCORPORATION BY REFERENCE

None.

BRIEF DESCRIPTION

In one aspect, a method for processing an electronic document file for printing in provided. In one embodiment, the method includes: a) receiving an electronic document file for printing on a select printer at a print driver for the select printer; b) determining the electronic document file includes at least some different print parameter information associated with a different printer based at least in part on configuration data, wherein the configuration data includes mapping information between different print parameter information associated with the different printer and select printer information associated with the select printer, wherein the different print parameter information and the at least some different print parameter information are at least not fully compatible with the select printer; c) identifying and transforming the at least some different print parameter information to corresponding select print parameter information based at least in part on the mapping information; d) processing document print parameter information associated with the electronic document file received in a), wherein at least a portion of the document print parameter information was transformed from the at least some different print parameter information identified in c); and e) sending a print stream from the print driver to the select printer for printing the electronic document file in a manner consistent with the at least some different print parameter information.

In another aspect, an apparatus for processing an electronic document file for printing is provided. In one embodiment, the apparatus includes: a storage device storing a print driver associated with a select printer and a configuration file accessible to the print driver, wherein the configuration data includes mapping information between different print parameter information associated with a different printer and select print parameter information associated with the select printer, wherein the different print parameter information is at least not fully compatible with the select printer; and a processor in operative communication with the storage device to selectively use the print driver in conjunction with printing an electronic document file on the select printer. In this embodiment, the print driver includes: an input module that receives the electronic document file for printing on the select printer; a filter module in operative communication with the input module and the storage device to access the configuration data, wherein the filter module uses the configuration data to determine the electronic document file includes at least some different print parameter information, wherein the at least some different print parameter information is at least not fully compatible with the select printer; a mapping module in operative communication with the filter module and the storage device to use the configuration data to identify and transform the at least some different print parameter information to corresponding select print parameter information based at least in part on the mapping information; a processing module in operative communication with the filter module and the mapping module to process document print parameter information associated with the electronic document file, wherein at least a portion of the document print parameter information was transformed from the at least some different print parameter information; and an output module that sends a print stream to the select printer for printing the electronic document file in a manner consistent with the at least some different print parameter information.

In yet another aspect, another method for processing an electronic document file for printing is provided. In one embodiment, the method includes: a) generating mapping information between different print parameter information associated with a different printer and select print parameter information associated with a select printer and storing the mapping information in configuration data, wherein the different print parameter information is at least not fully compatible with the select printer; b) receiving an electronic document file for printing on the select printer at a print driver for the select printer; c) determining the electronic document file includes at least some different print parameter information based at least in part on the configuration data, wherein the at least some different print parameter information is at least not fully compatible with the select printer; d) identifying and transforming the at least some different print parameter information to corresponding select print parameter information based at least in part on the mapping information; e) processing document print parameter information associated with the electronic document file received in b), wherein at least a portion of the document print parameter information was transformed from the at least some different print parameter information identified in d); and f) sending a print stream from the print driver to the select printer for printing the electronic document file in a manner consistent with the at least some different print parameter information.

DETAILED DESCRIPTION

Figure 1:
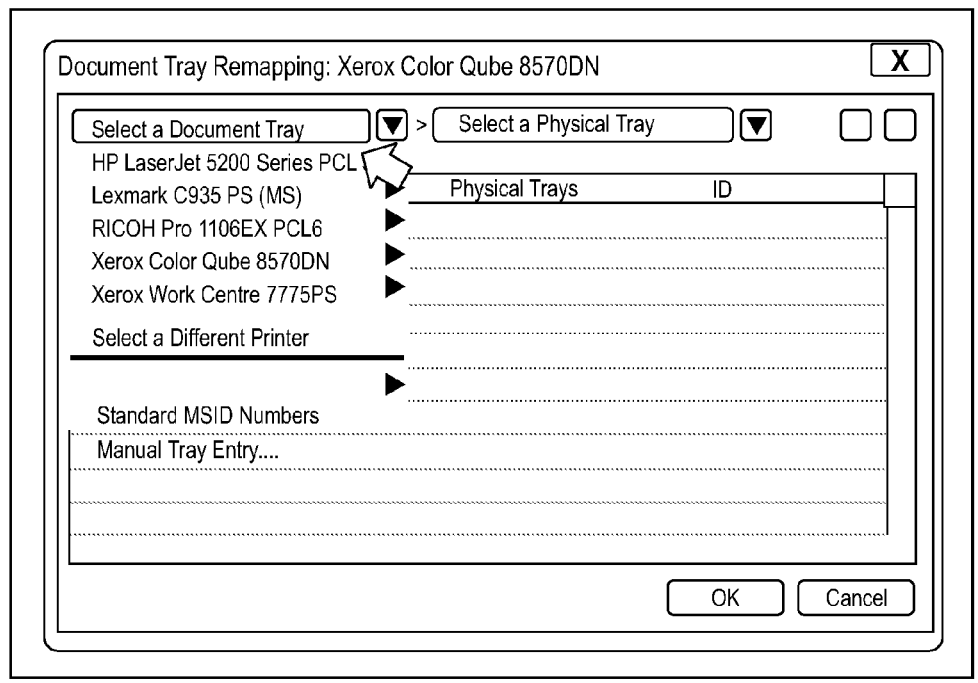
FIG. 1 is a screen view of an exemplary dialog box associated with an exemplary embodiment of a mapping tool for mapping print parameter information between different printers.
Figure 2:
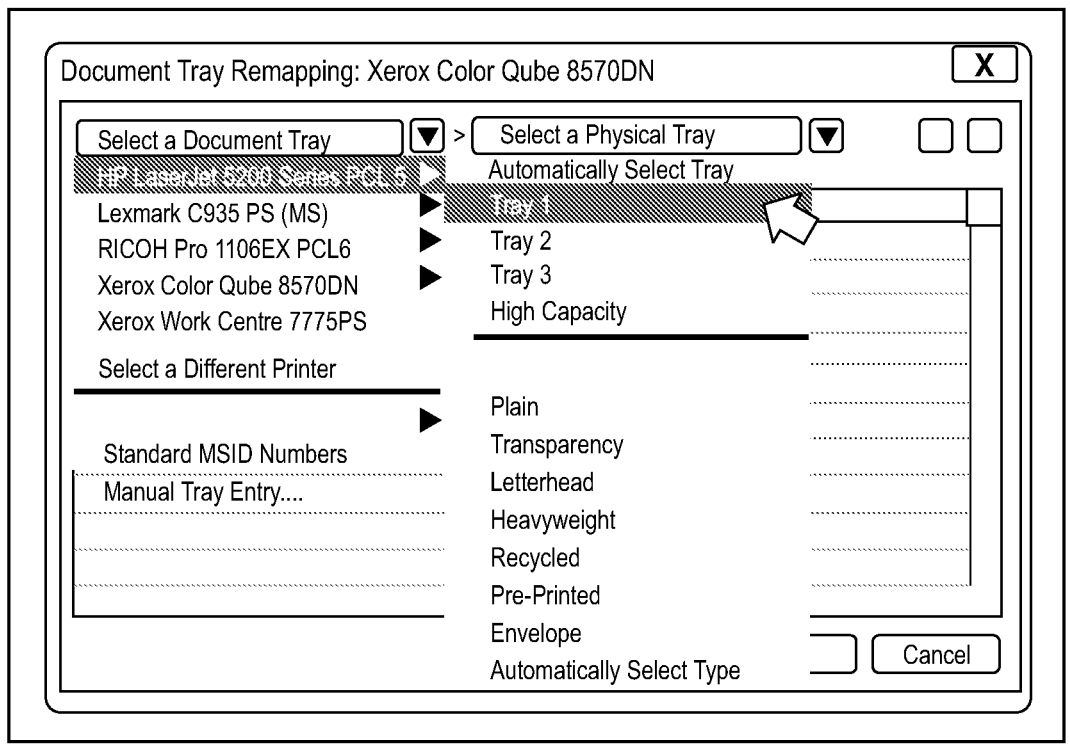
FIG. 2 is a screen view of another exemplary dialog box associated with an exemplary embodiment of a mapping tool for mapping print parameter information between different printers.
Figure 3:
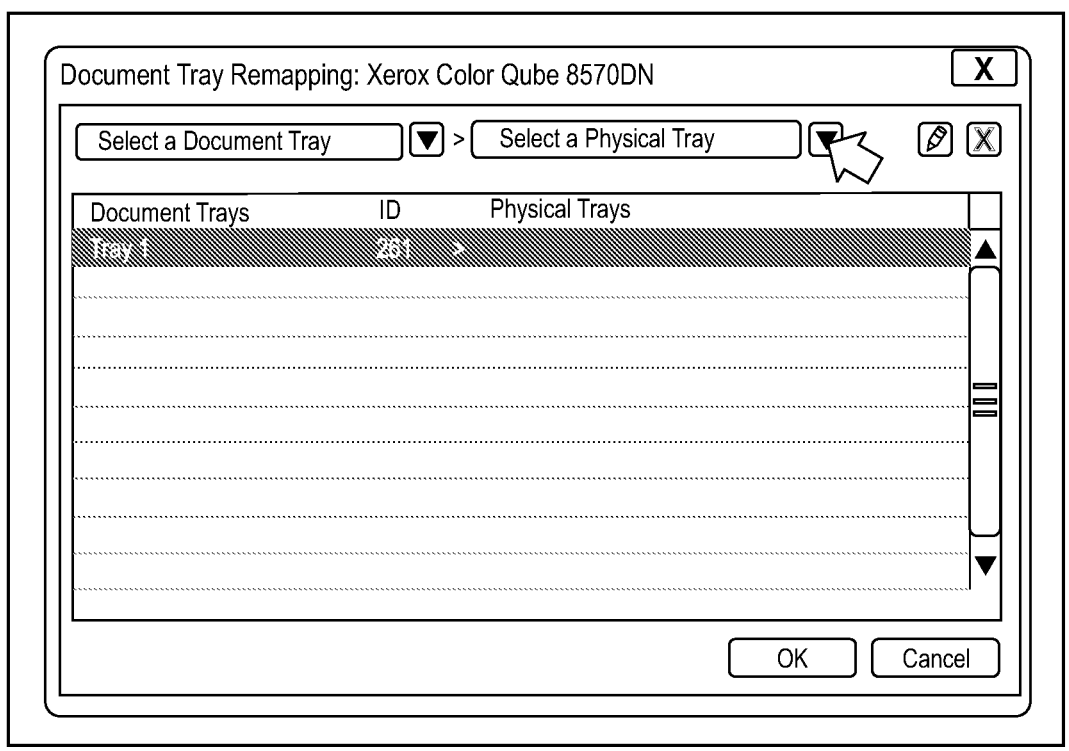
FIG. 3 is a screen view of yet another exemplary dialog box associated with an exemplary embodiment of a mapping tool for mapping print parameter information between different printers.
Figure 4:
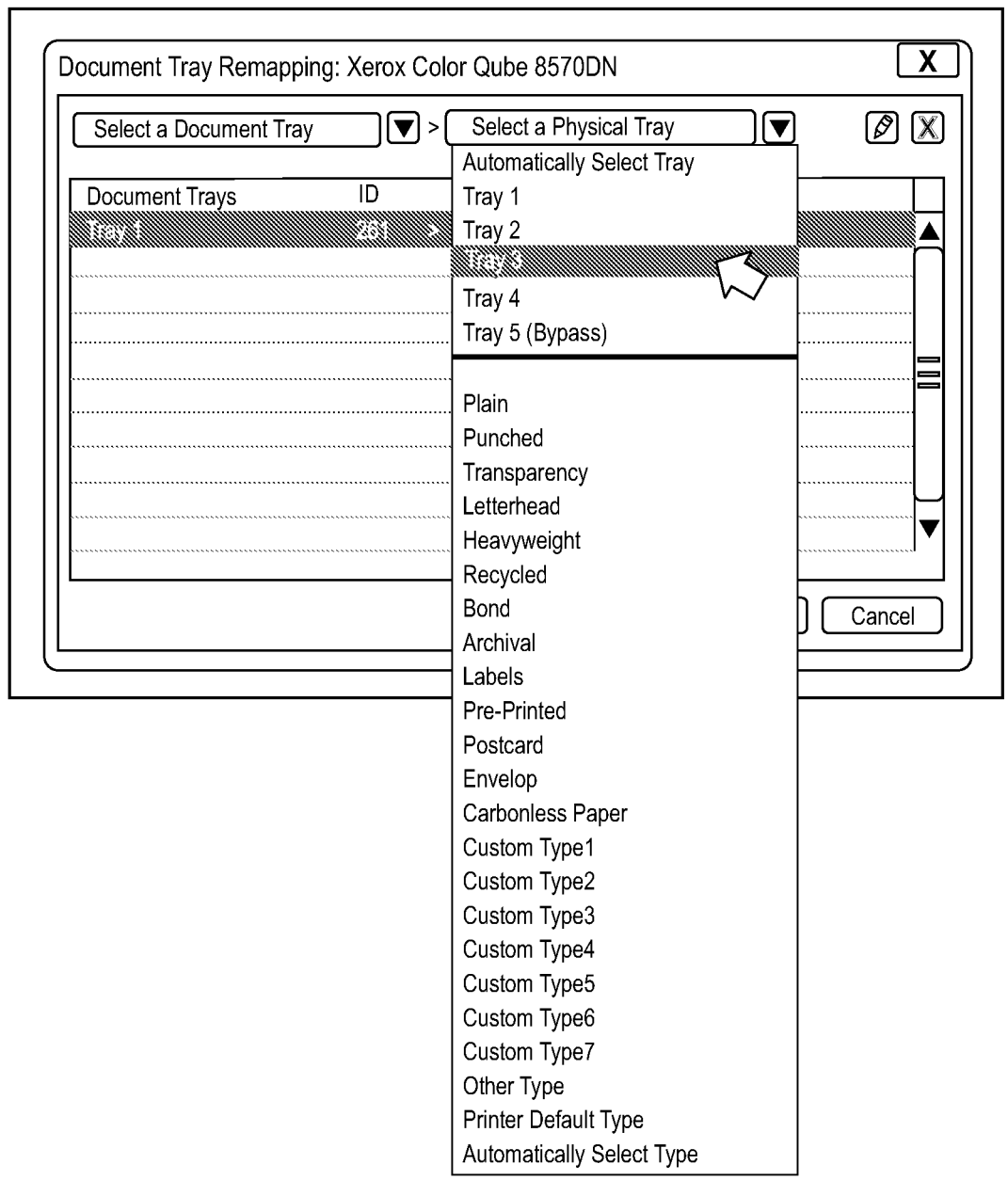
FIG. 4 is a screen view of still another exemplary dialog box associated with an exemplary embodiment of a mapping tool for mapping print parameter information between different printers.
Figure 5:
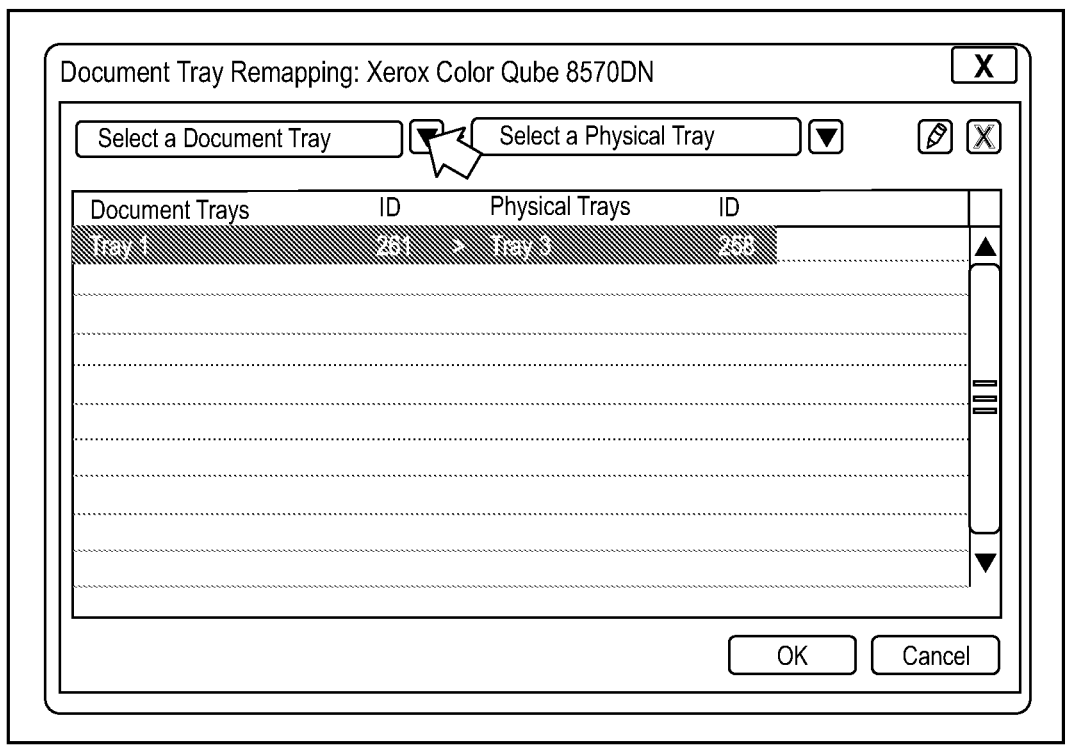
FIG. 5 is a screen view of still yet another exemplary dialog box associated with an exemplary embodiment of a mapping tool for mapping print parameter information between different printers.

This disclosure describes various embodiments of methods and systems in which a select print driver can be dynamically configured to allow customers to map information for media sizes, type, media input trays, or any variety of features not specifically supported by a corresponding select printer or family of select printers with which the select print driver is used. Print driver pre-configuration files may be generated before the select print driver is installed and loaded when the select print driver is installed or invoked. The select print driver may automatically make internal adjustments to utilize the information from different print drivers and present options supported by different printers with which the different print drivers are used as if such options were supported by the select printer.

A mapping tool associated with the select printer could be used to allow a user (e.g., Systems Administrator, customer, or sales representative) to examine a different print driver and collect different print parameter information to allow the select print driver to mimic features associated with the different printer. The different print parameter information may include, but not be limited to, display strings used by the different print driver and any required IDs used to correctly select the different specified attributes in the application. Features, such as media size, may also require media dimensions.

The mapping tool may also provide a user interface showing such things as input trays for the different printer and available input trays for the select. For example, the mapping tool may allow users to select a tray for the different printer and a corresponding tray for the select printer to be utilized when the tray for the different printer is selected. The screen shots in FIGS. 1-5 show exemplary dialog boxes associated with an exemplary embodiment of a mapping tool. Once the user is satisfied with the mapping of the different print driver features to the select print driver features, the mappings information may be saved to a configuration file or operating system specific features, such as a Registry, for use by the select print driver.

In order to fully utilize the select print driver, the mapping tool may be used in conjunction with an existing environment with the different printer that is being replaced by the select printer. Additionally, some mechanism may be used to provide the configuration data with the different printer-to-select printer mappings. This mechanism could be as simple as a Windows registry file that is added to a client PC being used for printing. A more complex mechanism could use a server in the "cloud" (e.g., communication network accessible to the client PC via any suitable network and/or gateway) that enables delivery of a preconfigured configuration file along with the select print driver without breaking digital signatures to push the mapping information to the client PC used for printing via an automated process.

Once the configuration data with appropriate mapping information has been made available to the select print driver, the select print driver may automatically configure itself each time it is loaded by the operating system to mimic the different print driver. No additional interaction by the user is required at print time except that which is normally required to print documents.

From a customer's perspective, they can get the improved performance expected from the select print driver without having to determine if any changes to existing documents are required in order for them to be compatible with the select printer. Even though the select printer may provide only select printer options, the UI for the select print driver may present options for both the select printer and the different printer. If possible, the select printer options may be presented first. Some software program applications sort the string for certain print parameter information presented in the print driver UI alphabetically. For these applications, the options for the select printer and the different printer may be intermixed in the display order. The information may be displayed in any suitable manner.

Figure 6:
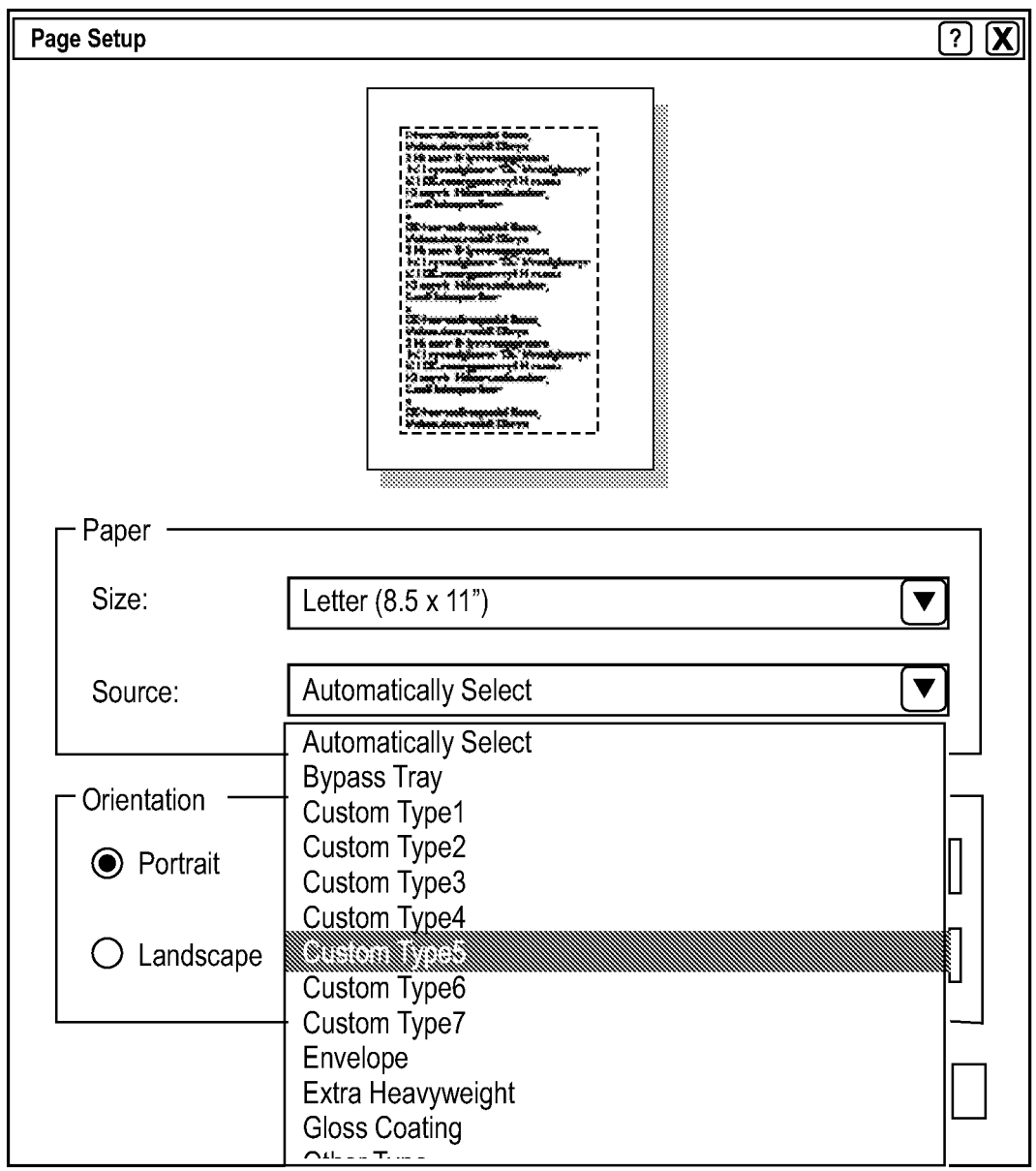
FIG. 6 is a screen view of an exemplary dialog box associated with a software application program showing selection of a paper source in conjunction with an exemplary embodiment of a print driver supporting options provided by a select printer.
Figure 7:
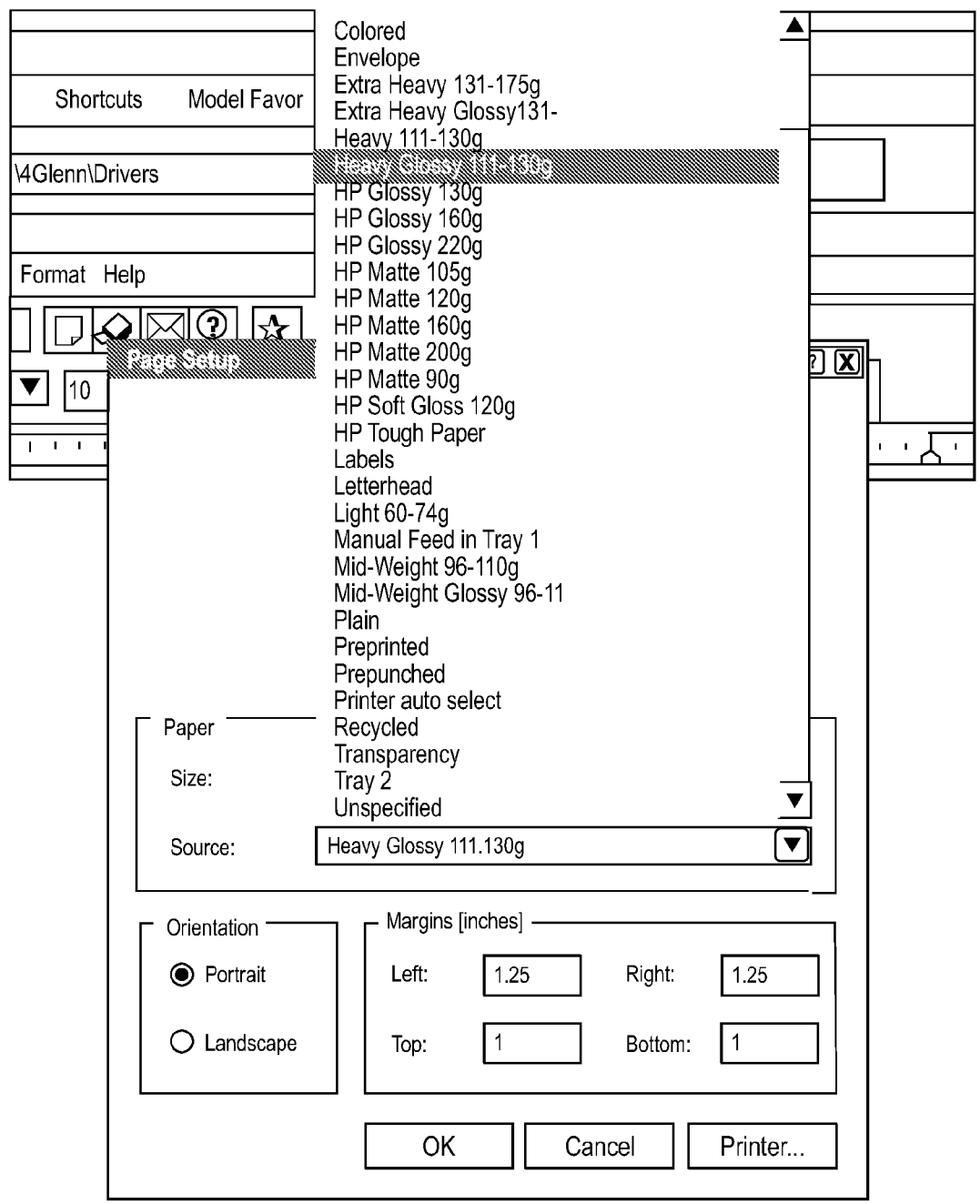
FIG. 7 is a screen view of an exemplary dialog box associated with a software application program showing selection of a paper source in conjunction with an exemplary embodiment of a print driver supporting options provided by both a select printer and a different printer.

FIG. 6 shows a screen view of an exemplary dialog box associated with Microsoft Word for selection of a paper source in conjunction with an exemplary embodiment of a select print driver supporting options provided only by a select printer. Alternatively, FIG. 7 shows a screen view of an exemplary dialog box associated with Microsoft Word for selection of a paper source in conjunction with an exemplary embodiment of a select print driver supporting options provided by both a select printer and a different printer.

Internally, within the select print driver, constraints and restrictions imposed on the various printing features still apply. As far as the select print driver is concerned, the user is simply utilizing select printer—regardless of whether the user is using the select print driver in conjunction with a software application program to select a feature support by the different printer to print on the select printer. In other words, no special actions are required by the user and printing is accomplished in the same manner with which they were accustomed when using the different printer.

Gradually, customers are expected to migrate to the capabilities of the select printer as they create and/or modify their documents. For example, if possible, each time a document is saved it may be automatically updated to utilize features of the select printer. However, if the customer does not modify a particular document, no further action will be required because the document will continue to print in the same manner as it did before a transition from the different printer to the select printer.

This ability to "mimic" a different print driver may give the vendor for the select printer a distinct advantage over its competitors. For example, this may allow the vendor for the select printer to move into customer sites that have previously been resistant to switch to a new printer. Additionally, the select print driver can be extended to include a variety of other features supported by many different printers. Support costs may go down for the customer because they will not have to be assisted in learning how to map existing document features to features of the select printer. The select print driver could also be used to transition from older versions of printers to an updated version of the printer from the same vendor.

Additionally, customers that decide to switch from the select printer to an environment with a new printer from a previous vendor or yet another vendor may be faced with exactly the same issue and may again use an embodiment of the process described herein to transition again without having to change existing documents that had been setup to print on any previous printers.

In summary, an electronic document file created by a software application (e.g., Microsoft Word) can have printer-specific information for a former printer or family of printers embedded within it. The printer-specific information may include paper sizes, paper trays, and paper types that the former printer or family of printers support. However, the printer-specific information embedded in the electronic document file may not be supported by other printers or families of printers. The various embodiments of methods and apparatus disclosed herein enable a new print driver for a new printer or family of printers can be configured such that the new printer or family of printers can cleanly print an electronic document file with embedded printer-specific information that is compatible with a former printer or family of printers and at least not fully compatible with the new printer or family of printers. In short, this makes the new print driver compatible with the former print driver so that electronic document files created with embedded printer-specific information for the former printer or family of printers can be printed on the new printer or family of printers without having to edit or alter the embedded printer-specific information. This enables printing of documents on the new printer or family of printers that were previously intended to be printed on the former printer or family of printers.

In one embodiment, a user would use a printer information mapping tool to specify how embedded printer-specific information (e.g., paper sizes, paper trays, paper types, etc.) for the former printer or family of printer maps to corresponding printer information for the new printer or family of printers. When the mappings are completed, the mapping tool produces configuration data containing the mappings. The new print driver imports the mapping information associated with the configuration data. The new print driver uses this mapping information to present a combined list that includes printer information for both the new printer and the former printer. When printing a document containing printer information associated with the former printer, the new print driver uses the mapping information to transform the printer information associated with the former printer into corresponding printer information associated with the new printer so that when the electronic document file prints on the new printer the document produced is consistent with documents that would be produced by the former printer.

For example, this facilitates transition of a user's printer or family of printers to another printer or family of printers by providing a means for existing electronic document files to satisfactorily print on the new printer or family of printers. This is especially useful for streamlining installation of a new printer or family of printers with minimal disruption to users.

Figure 8:
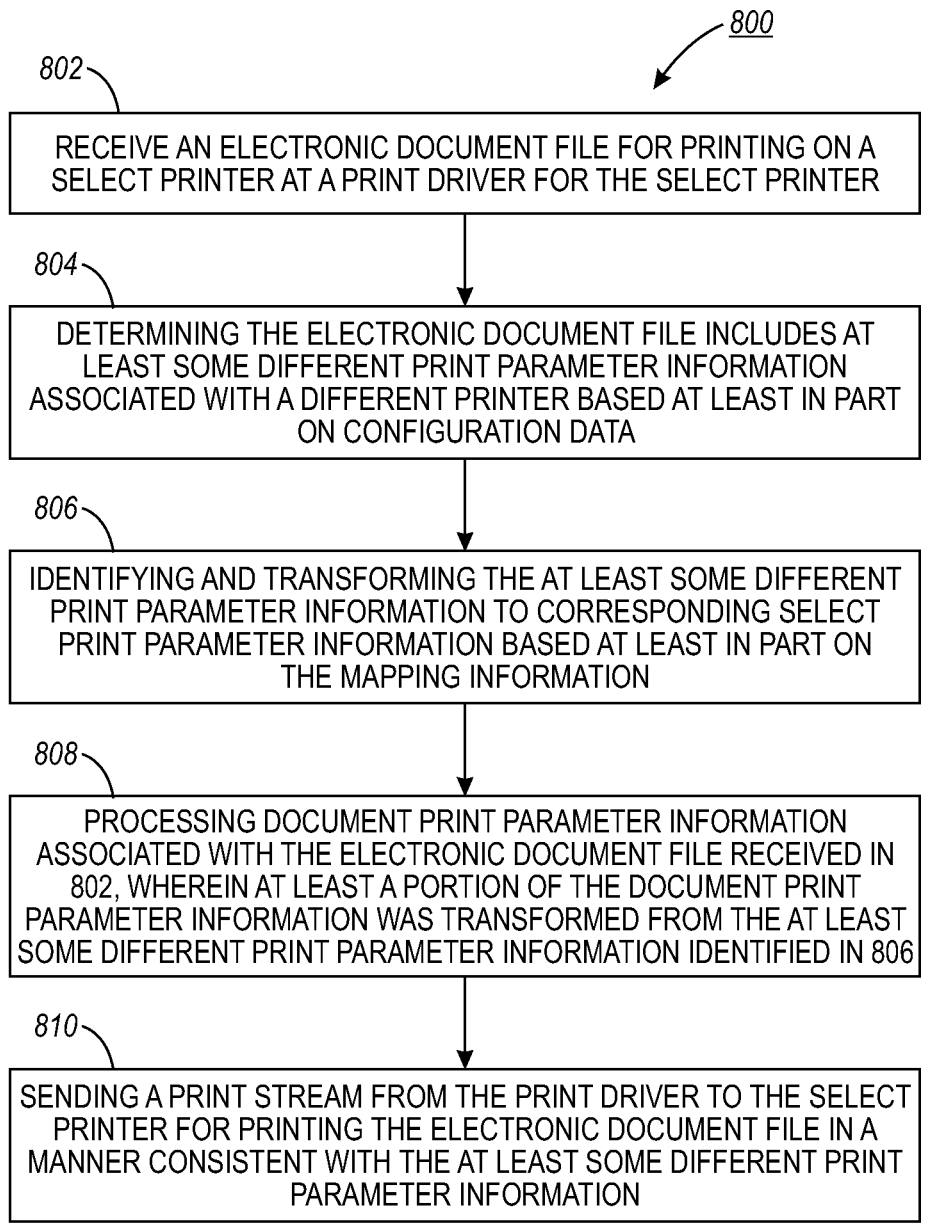
FIG. 8 is a flowchart showing an exemplary embodiment of a process for processing an electronic document file for printing.

With reference to FIG. 8, an exemplary embodiment of a process 800 for processing an electronic document file for printing begins at 802 where an electronic document file may be received for printing on a select printer at a print driver for the select printer. Next, the process may determine the electronic document file includes at least some different print parameter information associated with a different printer based at least in part on configuration data (804). The configuration data may include mapping information between different print parameter information associated with the different printer and select printer information associated with the select printer. The different print parameter information and the at least some different print parameter information may be at least not fully compatible with the select printer.

At 806, the at least some different print parameter information may be identified and transformed to corresponding select print parameter information based at least in part on the mapping information. Next, document print parameter information associated with the electronic document file received in 802 may be processed (808). At least a portion of the document print parameter information may have been transformed from the at least some different print parameter information identified in 806. At 810, a print stream may be sent from the print driver to the select printer for printing the electronic document file in a manner consistent with the at least some different print parameter information.

In another embodiment, the process 800 may also include generating the mapping information used in 804 and 806 using a mapping tool. The mapping information may be based at least in part on comparing the different print parameter information to the select print parameter information. In a further embodiment, the comparing and generating may be performed automatically in response to the mapping tool being initiated by a user. Alternatively, in another further embodiment, the comparing and mapping may be performed interactively via a user interface in response to the mapping tool being initiated by a user and the generating of the mapping information may be performed automatically in response to a user activation via the user interface indicating the comparing and mapping is complete. In yet another further embodiment, the comparing and generating may be performed automatically in conjunction with installation of the print driver.

In yet another embodiment of the process 800, the select printer and the print driver are co-located in a computer system. In a further embodiment, the computer system is a server system. Alternatively, in another further embodiment, the computer system is a stand-alone computer workstation. In still another embodiment of the process 800, the select printer is a network device associated with a computer network and the print driver is located within a networked computer workstation in operative communication with the select printer via the computer network.

Figure 9:
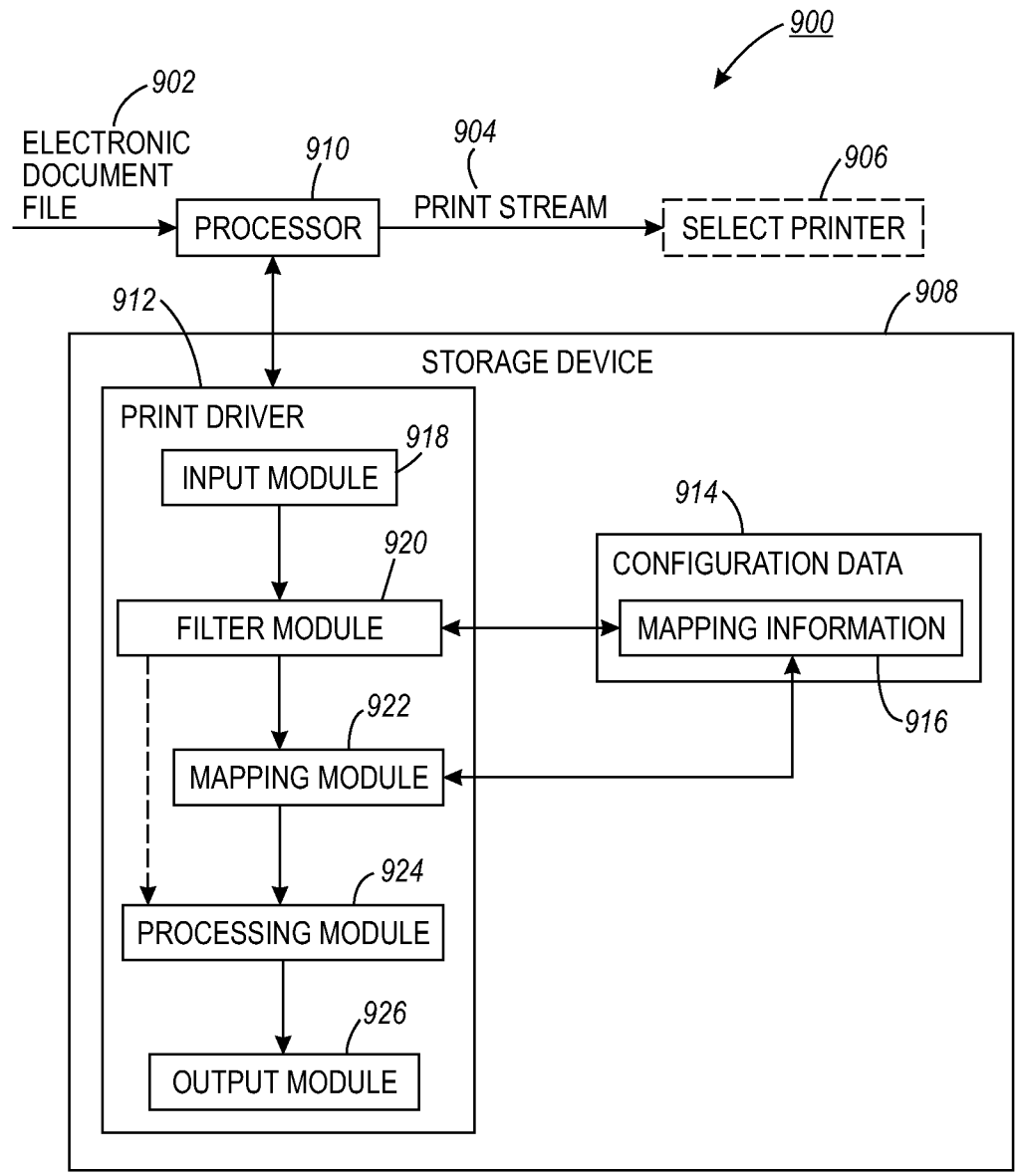
FIG. 9 is a block diagram of an exemplary embodiment of a system for processing an electronic document file for printing.

With reference to FIG. 9, an exemplary embodiment of a system 900 for processing an electronic document file 902 to form a print stream 904 for printing on a select printer 906 may include a storage device 908 and a processor 910. The storage device 908 may store a print driver 912 associated with the select printer 906 and configuration data 914 accessible to the print driver 912. The configuration data 914 will include mapping information 916 between different print parameter information associated with a different printer and select print parameter information associated with the select printer 906. The different print parameter information may be at least not fully compatible with the select printer 906. The processor 910 may be in operative communication with the storage device 908 to selectively use the print driver 912 in conjunction with printing the electronic document file 902 on the select printer 906.

In this embodiment, the print driver 912 may include an input module 918, a filter module 920, a mapping module 922, a processing module 924, and an output module 926. The input module 918 may receive the electronic document file 902 for printing on the select printer 906. The filter module 920 may be in operative communication with the input module 918 and the storage device 908 to access the configuration data 914. The filter module 920 may use the configuration data 914 to determine the electronic document file 902 includes at least some different print parameter information. The at least some different print parameter information may be at least not fully compatible with the select printer 906. The mapping module 922 may be operative communication with the filter module 920 and the storage device 908 to use the configuration data 914 to identify and transform the at least some different print parameter information to corresponding select print parameter information based at least in part on the mapping information 916. The processing module 924 may be operative communication with the filter module 920 and the mapping module 922 to process document print parameter information associated with the electronic document file 902. At least a portion of the document print parameter information may be transformed from the at least some different print parameter information. The output module 926 may send the print stream 904 to the select printer 906 for printing the electronic document file 902 in a manner consistent with the at least some different print parameter information.

Figure 10:
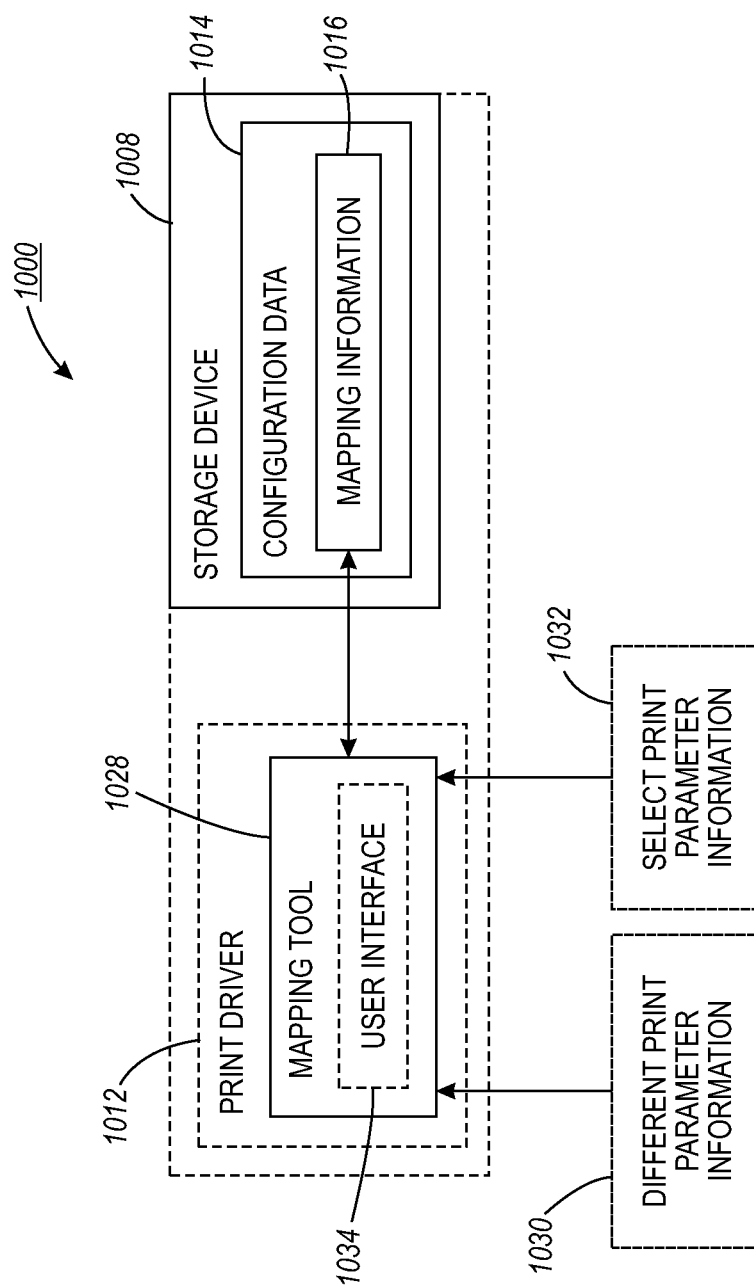
FIG. 10 is a block diagram of another exemplary embodiment of a system for processing an electronic document file for printing that includes an exemplary mapping tool for generating mapping information for use in conjunction with the printing.

With reference to FIG. 10, another exemplary embodiment of a system 1000 for processing an electronic document file may include a mapping tool 1028 in operative communication with the storage device 1008 to generate mapping information 1016 based at least in part on comparing different print parameter information 1030 to select print parameter information 1032. The mapping information 1016 may be stored on the storage device 1008 in the configuration data 1016. In a further embodiment, the mapping tool 1028 may automatically compare the different print parameter information 1030 to the select print parameter information 1032 to generate the mapping information 1016 in response to being initiated by a user. Alternatively, in another further embodiment, the mapping tool 1028 may include a user interface module 1034 to enable the user to interactively compare and map the different print parameter information 1030 to the select print parameter information 1032. In this embodiment, the mapping tool 1028 may generate the mapping information 1016 in response to a user activation via the user interface 1034 indicating the comparing and mapping is complete. In still another further embodiment, the print driver 1012 may include the mapping tool 1028. In this embodiment, the mapping tool 1028 may be initiated automatically to compare the different print parameter information 1030 to the select print parameter information 1032 to generate the mapping information 1016 in conjunction with installation of the print driver 1012 on the storage device 1008.

With reference again to FIG. 9, in another embodiment of the system 900, the storage device 908 and processor 910 may be co-located in a computer system. In a further embodiment, the computer system may be a server system. Alternatively, in another further embodiment, the computer system may be a networked computer workstation. In still another further alternate embodiment, the computer system may be a stand-alone computer workstation.

Figure 11:
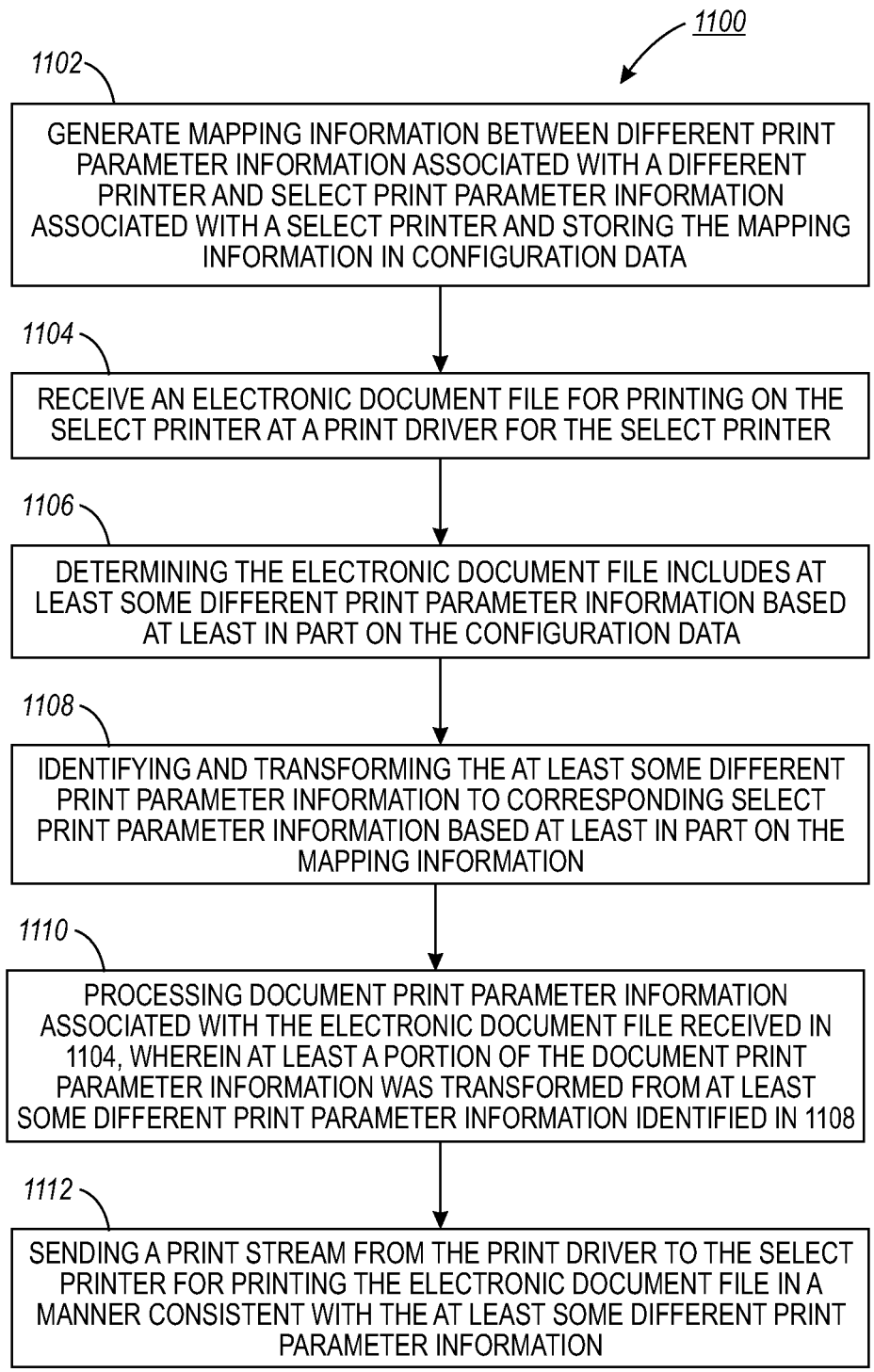
FIG. 11 is a flowchart showing another exemplary embodiment of a process for processing an electronic document file for printing.

With reference to FIG. 11, an exemplary embodiment of a process 1100 for processing an electronic document file for printing begins at 1102 where mapping information between different print parameter information associated with a different printer and select print parameter information associated with a select printer may be generated and stored in a configuration file or operating system specific feature, such as a Registry. The different print parameter information may be at least not fully compatible with the select printer. Next, an electronic document file may be received for printing on the select printer at a print driver for the select printer (1104). At 1106, the process may determine the electronic document file includes at least some different print parameter information based at least in part on the configuration data. The at least some different print parameter information may be at least not fully compatible with the select printer. Next, the at least some different print parameter information may be identified and transformed to corresponding select print parameter information based at least in part on the mapping information (1108). At 1110, document print parameter information associated with the electronic document file received in 1104 may be processed. At least a portion of the document print parameter information may be transformed from the at least some different print parameter information identified in 1108. Next, a print stream may be sent from the print driver to the select printer for printing the electronic document file in a manner consistent with the at least some different print parameter information (1112)

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for processing an electronic document file for printing, comprising:
   a) receiving an electronic document file at a processor of a computer system for printing on a select printer using a print driver for the select printer;
   b) determining the electronic document file includes at least some different print parameter information associated with a different printer based at least in part on configuration data, wherein the configuration data includes mapping information between different print parameter information associated with the different printer and select printer information associated with the select printer, wherein the different print parameter information and the at least some different print parameter information are at least not fully compatible with the select printer;
   c) identifying and transforming the at least some different print parameter information to corresponding select print parameter information based at least in part on the mapping information;
   d) processing document print parameter information associated with the electronic document file received in a) to form a print stream compatible with the select printer, wherein at least a portion of the document print parameter information was transformed from the at least some different print parameter information identified in c); and
   e) sending the print stream from the processor using the print driver to the select printer for printing the electronic document file in a manner consistent with the at least some different print parameter information in the received electronic document file.

2. The method set forth in claim 1, further comprising:
   f) generating the mapping information used in b) and c) using a mapping tool, wherein the mapping information is based at least in part on comparing the different print parameter information to the select print parameter information.

3. The method set forth in claim 2 wherein the comparing and generating in f) is performed automatically in response to the mapping tool being initiated by a user.

4. The method set forth in claim 2 wherein the comparing and mapping in f) is performed interactively via a user interface in response to the mapping tool being initiated by a user and the generating of the mapping information in f) is performed automatically in response to a user activation via the user interface indicating the comparing and mapping is complete.

5. The method set forth in claim 2 wherein the comparing and generating in f) is performed automatically in conjunction with installation of the print driver.

6. The method set forth in claim 1 wherein the select printer and the print driver are co-located in the computer system.

7. The method set forth in claim 6 wherein the computer system is a server system.

8. The method set forth in claim 6 wherein the computer system is a stand-alone computer workstation.

9. The method set forth in claim 1 wherein the select printer is a network device associated with a computer network and the print driver is located within a networked computer workstation in operative communication with the printer via the computer network.

10. An apparatus for processing an electronic document file for printing, comprising:
    a storage device storing a print driver associated with a select printer and configuration data accessible to the print driver, wherein the configuration data includes mapping information between different print parameter information associated with a different printer and select print parameter information associated with the select printer, wherein the different print parameter information is at least not fully compatible with the select printer; and
    a processor in operative communication with the storage device to selectively use the print driver in conjunction with printing an electronic document file on the select printer;
    the print driver comprising:
       an input module that receives the electronic document file at the processor for printing on the select printer;
       a filter module in operative communication with the input module and the storage device to access the configuration data, wherein the filter module uses the configuration data to determine the electronic document file includes at least some different print parameter information, wherein the at least some different print parameter information is at least not fully compatible with the select printer;
       a mapping module in operative communication with the filter module and the storage device to use the configuration data to identify and transform the at least some different print parameter information to corresponding select print parameter information based at least in part on the mapping information;
       a processing module in operative communication with the filter module and the mapping module to process document print parameter information associated with the electronic document file to form a print stream compatible with the select printer, wherein at least a portion of the document print parameter information was transformed from the at least some different print parameter information; and
       an output module that sends the print stream from the processor to the select printer for printing the electronic document file in a manner consistent with the at least some different print parameter information in the electronic document file received by input module.

11. The apparatus set forth in claim 10, further comprising:
    a mapping tool in operative communication with the storage device to generate the mapping information based at least in part on comparing the different print parameter information to the select print parameter information.

12. The apparatus set forth in claim 11 wherein the mapping tool is adapted to automatically compare the different print parameter information to the select print parameter information to generate the mapping information in response to being initiated by a user.

13. The apparatus set forth in claim 11, the mapping tool further comprising:
    a user interface module adapted to enable the user interactively compare and map the different print parameter information to the select print parameter information, the mapping tool adapted to generate the mapping information in response to a user activation via the user interface indicating the comparing and mapping is complete.

14. The apparatus set forth in claim 11, the print driver further comprising the mapping tool.

15. The apparatus set forth in claim 14 wherein the mapping tool is adapted to be initiated automatically to compare the different print parameter information to the select print parameter information to generate the mapping information in conjunction with installation of the print driver on the storage device.

16. A method for processing an electronic document file for printing, comprising:
   a) generating mapping information between different print parameter information associated with a different printer and select print parameter information associated with a select printer and storing the mapping information in configuration data, wherein the different print parameter information is at least not fully compatible with the select printer;
   b) receiving an electronic document file at a processor of a computer system for printing on the select printer using a print driver for the select printer;
   c) determining the electronic document file includes at least some different print parameter information based at least in part on the configuration data, wherein the at least some different print parameter information is at least not fully compatible with the select printer;
   d) identifying and transforming the at least some different print parameter information to corresponding select print parameter information based at least in part on the mapping information;
   e) processing document print parameter information associated with the electronic document file received in b) to form a print stream compatible with the select printer, wherein at least a portion of the document print parameter information was transformed from the at least some different print parameter information identified in d); and
   f) sending the print stream from the processor using the print driver to the select printer for printing the electronic document file in a manner consistent with the at least some different print parameter information in the received electronic document file.

17. The method set forth in claim 16 wherein the generated mapping information is based at least in part on comparing the different print parameter information to the select print parameter information.

18. The method set forth in claim 17 wherein the mapping information is generated automatically in response to a mapping tool being initiated by a user.

19. The method set forth in claim 17 wherein the different and select print parameter information is compared interactively via a user interface in response to a mapping tool being initiated by a user and the mapping information is generated automatically in response to a user activation via the user interface indicating the comparing is complete.

20. The method set forth in claim 16 wherein the mapping information is generated automatically in conjunction with installation of the print driver.

* * * * *